(12) United States Patent
Kristof et al.

(10) Patent No.: US 11,598,612 B2
(45) Date of Patent: Mar. 7, 2023

(54) BALLISTIC FIBERGLASS MOLD

(71) Applicant: 360° Ballistics, LLC, Wake Forest, NC (US)

(72) Inventors: Richard Kristof, Holly Springs, NC (US); Mark Alan Siver, Youngsville, NC (US); Mark Buchmann, Wilmette, IL (US)

(73) Assignee: 360° BALLISTICS, LLC, Wake Forest, NC (US)

( * ) Notice: Subject to any disclaimer, the term of this patent is extended or adjusted under 35 U.S.C. 154(b) by 0 days.

(21) Appl. No.: 17/359,290

(22) Filed: Jun. 25, 2021

(65) Prior Publication Data
US 2022/0412697 A1 Dec. 29, 2022

(51) Int. Cl.
*F41H 5/04* (2006.01)
*B28B 1/30* (2006.01)
*F41J 13/00* (2009.01)
*F41H 5/24* (2006.01)

(52) U.S. Cl.
CPC ............. *F41H 5/0428* (2013.01); *B28B 1/30* (2013.01); *F41H 5/24* (2013.01); *F41J 13/00* (2013.01)

(58) Field of Classification Search
CPC ........... F41H 5/0428; F41H 5/24; B28B 1/30; F41J 13/00
USPC ....................................................... 89/36.02
See application file for complete search history.

(56) References Cited

U.S. PATENT DOCUMENTS

| | | | |
|---|---|---|---|
| 3,520,967 A * | 7/1970 | Kreier, Jr. | B28B 7/164 249/115 |
| 3,954,377 A * | 5/1976 | Scholz | B28B 7/364 249/161 |
| 4,046,582 A | 9/1977 | Kawamura et al. | |
| 4,249,948 A | 2/1981 | Okada et al. | |
| 4,391,664 A | 7/1983 | Kramer | |
| 4,488,910 A | 12/1984 | Nicholson et al. | |
| 4,737,193 A | 4/1988 | Gutmann et al. | |
| 5,456,752 A | 10/1995 | Hogan | |
| 5,976,656 A | 11/1999 | Giraud | |
| 6,009,635 A * | 1/2000 | Vidaurre | B29C 70/48 264/102 |
| 6,264,735 B1 | 7/2001 | Bean et al. | |
| 6,423,134 B1 | 7/2002 | Trottier et al. | |

(Continued)

FOREIGN PATENT DOCUMENTS

| | | | | |
|---|---|---|---|---|
| GB | 2421213 A * | 6/2006 | ............... | B28B 1/52 |
| WO | 2012020229 A1 | 2/2012 | | |
| WO | WO-2015109261 A1 * | 7/2015 | ............. | C04B 28/32 |

OTHER PUBLICATIONS

Hudson, Kenneth L. et al.. Final Report Demonstration of Shock-Absorbing Concrete (SACON) Bullet Trap Technology (Report No. ATC-8183), Aug. 1999, 219 pages, U.S. Army Environmental Center, Aberdeen Proving Ground, MD 21010-5401.

(Continued)

*Primary Examiner* — Samir Abdosh
(74) *Attorney, Agent, or Firm* — NEO IP

(57) ABSTRACT

This disclosure is directed to an improved ballistic construct including ballistic concrete cured in a ballistic fiberglass mold, where the ballistic fiberglass mold remains part of the construct after curing. The fiberglass ballistic construct is stronger than concrete alone and does not significantly increase the weight of the construct. The improved construct is useful for firearms training and in the erecting of bulletproof structures which need ballistics protection.

13 Claims, 10 Drawing Sheets

(56) References Cited

U.S. PATENT DOCUMENTS

| | | |
|---|---|---|
| 6,582,511 B1 | 6/2003 | Velpari |
| 6,620,236 B2 | 9/2003 | Huntsman et al. |
| 6,688,811 B2 | 2/2004 | Forrester |
| 6,758,897 B2 | 7/2004 | Rieder et al. |
| 6,972,100 B2 | 12/2005 | Minke et al. |
| 7,111,847 B2 | 9/2006 | Larson et al. |
| 7,243,921 B2 | 7/2007 | Larson et al. |
| 7,562,613 B2 | 7/2009 | Ahmad |
| 7,677,151 B2 | 3/2010 | Ahmad |
| 7,748,307 B2 | 7/2010 | Hallissy et al. |
| 7,845,266 B2 | 12/2010 | Duke et al. |
| 7,849,780 B1 | 12/2010 | Hallissy et al. |
| 8,043,982 B2 | 10/2011 | Telander |
| 8,061,257 B2 | 11/2011 | Tonyan et al. |
| D662,225 S | 6/2012 | Amidon et al. |
| 8,881,480 B1 * | 11/2014 | Horwath .................. E04B 1/80 52/407.4 |
| 8,959,862 B1 | 2/2015 | Kreizinger |
| 9,074,850 B2 | 7/2015 | Bergiadis |
| 9,121,675 B1 | 9/2015 | Amidon et al. |
| 9,440,883 B1 | 9/2016 | Brien |
| 9,604,321 B1 | 3/2017 | Amidon et al. |
| 10,240,338 B2 | 3/2019 | Durst et al. |
| 2007/0028541 A1 * | 2/2007 | Pasek ....................... E04C 3/20 52/250 |
| 2007/0062143 A1 | 3/2007 | Noushad |
| 2008/0092471 A1 | 4/2008 | Ahmad |
| 2009/0049778 A1 | 2/2009 | Kralic et al. |
| 2009/0169855 A1 | 7/2009 | Tunis |
| 2009/0282969 A1 | 11/2009 | Ahmad |
| 2009/0293711 A1 | 12/2009 | Altergott et al. |
| 2010/0171239 A1 * | 7/2010 | Ingalls ...................... B28B 7/28 264/334 |
| 2010/0229715 A1 | 9/2010 | Tonyan et al. |
| 2010/0230035 A1 | 9/2010 | Frank et al. |
| 2010/0326336 A1 | 12/2010 | Struthers et al. |
| 2011/0107904 A1 | 5/2011 | Queheillalt et al. |
| 2012/0090452 A1 | 4/2012 | Sudhakar |
| 2013/0012625 A1 | 1/2013 | Li et al. |
| 2014/0150362 A1 | 6/2014 | Propst |
| 2015/0315798 A1 | 11/2015 | Propst |
| 2016/0289121 A1 | 10/2016 | Coleman |
| 2017/0160059 A1 | 6/2017 | Amidon et al. |
| 2017/0175388 A1 | 6/2017 | Siver et al. |
| 2017/0234659 A1 | 8/2017 | Amidon et al. |

OTHER PUBLICATIONS

Technical Specification for Shock Absorbing Concrete (SACON.RTM.)—Shock Absorbing Concrete for Constructing Live-Fire Training Facilities, Document metadata bears creation date of Feb. 12, 2007, 25 pages, U.S. Army Corps of Engineers.

Whiting, David A., Manual on Control of Air Content in Concrete, 1998, 52 pages, Portland Cement Association, Skokie, Illinois, USA.

* cited by examiner

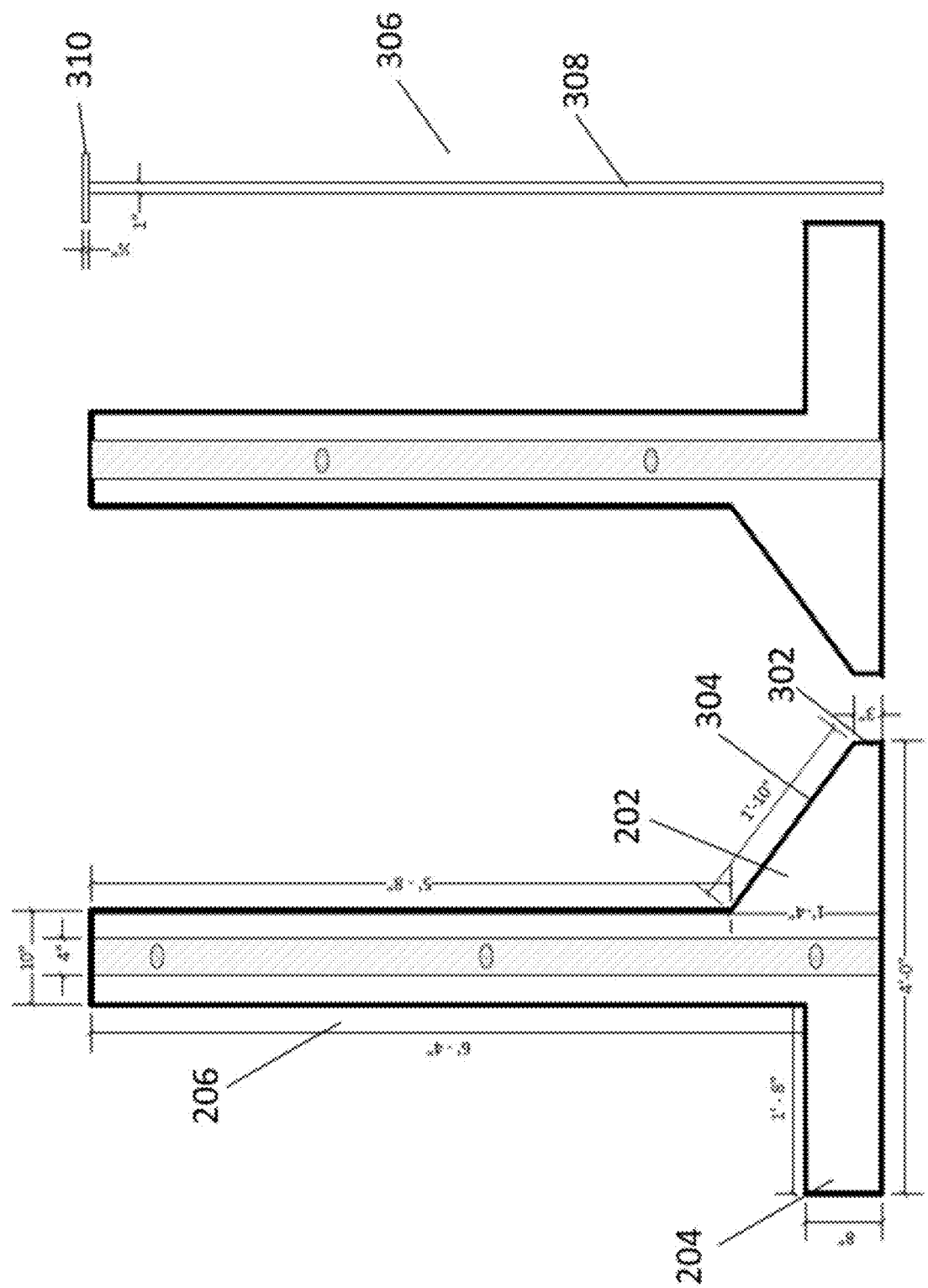

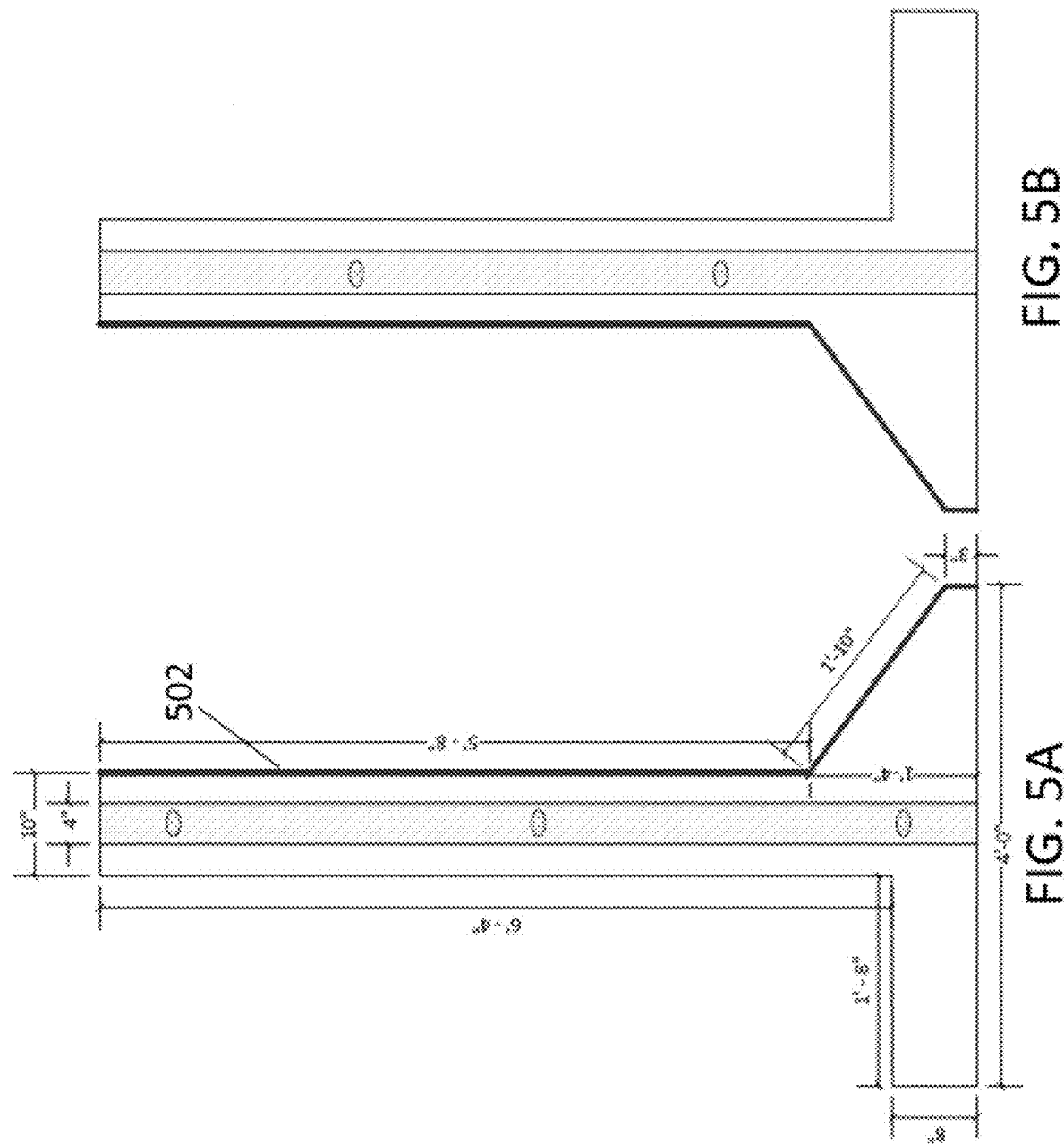

BALLISTIC FIBERGLASS MOLD

BACKGROUND OF THE INVENTION

Field of the Invention

The present invention relates to a ballistic concrete construct, and more specifically to a ballistic concrete construct comprising a ballistic fiberglass mold into which ballistic concrete is poured, where the ballistic fiberglass mold remains part of the construct after curing.

Description of the Prior Art

It is generally known in the prior art to provide panels comprising cementitious cores covered in fiber skins.

Shock Absorbing Concrete (SACON®)

Training is essential for both the military and civilian police forces. However, designing adequate backstops for military training, police, or civilian target practice, has been difficult. There are many difficulties associated with preparing such backstops. For example, a material must be strong enough to stop bullets, yet also must not cause ricochets because of risk to a shooter or bystander and must minimize the creation of lead dust from bullets spalling or fragmenting on impact. Wood backstops are problematic because insect or vermin infestation often leads to degradation and breakdown. Chemical treatment of wood creates additional environmental hazards associated with biocides or other toxins. Earthen barriers are difficult to move and stage in different settings, such as different lighting conditions. Over time earthen barriers erode or wash away. Historically, fiber reinforced foamed concrete provided some benefits for training structures as a material that (1) resisted breakdown, (2) stopped bullets, and (3) prevented ricochets.

Lead from bullets is another fundamental problem. Lead is a heavy metal neurotoxin that accumulates over time in soft tissues, blood and bone. Exposures to extremely low concentrations of lead have been documented to cause learning disabilities and other neurological damage. Thus, lead is hazard with a potential for long-term harm. Lead from bullets often enters the environment as either elemental lead dust generated from the impact of bullets with the backstop or lead salts which leach from the backstop into water supplies.

To address many of these concerns, researchers at the U.S. Army Engineer Research and Development Center (ERDC) invented SACON®, a low-leaching, foamed concrete. SACON® is effective at absorbing low power projectiles and eliminating ricochets. As currently formulated, it is a fiber-reinforced concrete with high concentrations of calcium phosphate and aluminum hydroxide to prevent leaching of lead fragments. U.S. Pat. No. 6,264,735 (Bean et al., "the '735 patent") describes SACON® and the reduced lead-leaching from the SACON® blocks. U.S. Pat. No. 6,620,236 (Huntsman et al., "the '236 patent") describes an improvement of the '735 patent formulation that includes an aluminum hydroxide additive to reduce or eliminate the erosion of heavy metals such as lead from the foamed concrete. The contents of both the '735 and the '236 patents are hereby incorporated by reference in its entirety.

SACON® is prepared using an air compressor by adding a wet foam that contains a foaming agent and a foam stabilizing agent such as hydroxypropyl methyl cellulose. The wet foam is added to the concrete mixture to achieve the appropriate density required by the military specifications. SACON® has been widely used by the military on bases in the U.S. and abroad. It has been used by other government agencies, e.g., police forces or the Drug Enforcement Agency. It is effective in stopping bullets from conventional small arms such as rifles (.22 caliber, M16 (5.56 mm)) or pistols (.38 caliber, .45 caliber, 9 mm). The reported penetration depths range from 1 inch (25 mm) for a .38 caliber pistol to 2.55 inches (63 mm) for 5.56 mm (M16 rifle), see Hudson et al., Final Report Demonstration of Shock-Absorbing Concrete (SACON) Bullet Trap Technology, August 1999.

While SACON® barriers are effective for conventional low power arms, e.g., 9 mm or 5.56 mm, they are ineffective for very high power bullets such as fifty caliber bullets. Fifty caliber bullets have been reported to penetrate SACON® to a depth of 18 inches or more. Given that the SACON® barriers are often approximately two feet thick and sometimes receive impacts from either side of the barrier, 18 inches of penetration (to the trailing edge of the bullet) is too deep. The military has a long-felt need for a barrier that would be effective for very high power weapons such as the fifty caliber so they are able to have more flexibility in the layout and design for their fifty caliber training exercises. Anecdotal reports from military bases indicate that stray bullets from fifty caliber weapons are occasionally found in the small caliber arms ranges, indicating that conventional backstops are not 100% effective. Thus, there is a need for more reliable backstops for use with fifty caliber training exercises. In addition, trainers would like to be able to have live-fire exercises using fifty caliber weapons in combination with other small arms or grenades. An example of such a drill would be live-fire from a fifty-caliber weapon on a Humvee while soldiers use conventional arms to attack a mock enclave. The disclosure described herein addresses this long-felt need for improved barriers, structures, or constructs capable of stopping very high-power bullets.

Prior art patent documents include the following:

US Patent Pub. No. 2010/0326336 for Multi-layer panel by inventor Struthers, et al., filed Jun. 28, 2010 and published Dec. 30, 2010, is directed to a multi-threat panel including two first layers of polyurea mix, for at least one of reflecting and attenuating blast pressure and restricting ballistic penetration of the panel, and a layer of a concrete mix, including a ceramic aggregate, for increasing resistance to blast pressure and ballistic penetration of the panel. The first layers coat the concrete layer.

U.S. Pat. No. 8,061,257 for Cement based armor panel system by inventor Tonyan, et al., filed Feb. 27, 2009 and issued Nov. 22, 2011, is directed to a cementitious armor panel assembly including cementitious armor panel with ballistic and blast resistant properties attached to a frame structure to produce a protective structure. The cementitious armor panels have a continuous phase resulting from the curing of an aqueous mixture of an inorganic cement binder, an inorganic mineral filler having a particle size of about 150-450 microns, a pozzolanic mineral filler, a polycarboxylate based superplasticizer self-leveling agent, and water. The mixture may also contain alkanolamine, and acid or acid salt. Prior to curing, the continuous phase is reinforced with fiber uniformly distributed in the continuous phase before it is cured to form the panel. The panel may be reinforced with a skin attached to at least one surface of the panel.

U.S. Pat. No. 10,240,338 for Transportable modular system for covered isolation of assets by inventor Durst, et al., filed Dec. 3, 2012 and issued Mar. 26, 2019, is directed to an easily assembled, transportable, re-deployable, modular, protective, double-roof system is disclosed which is compatible with other Modular Protective System (MPS) components and can be assembled in a variety of configurations to provide soldiers and equipment with protective enclosures.

US Patent Pub. No. 2012/0090452 for Ballistic panel with configurable shielding by inventor Sudhakar, filed Oct. 15, 2010, and published Apr. 19, 2012, is directed to a ballistic panel providing protection from various munitions. The ballistic panel may be configured to conform to various contours and shapes. In this way, the ballistic panel may be used to create or replace traditional non-ballistic panels, such as those found in structures, vehicles, and device enclosures. The ballistic panel may comprise one or more layers of material including fiberglass, metal, mesh, ceramic, and natural and synthetic materials, among others. The ballistic panel may protect individuals, property, devices, and other assets from physical damage, electromagnetic radiation, and the like. The ballistic panel may be inexpensively constructed with low cost materials and manufacturing processes.

U.S. Pat. No. 7,849,780 for Shielding for structural support elements by inventor Hallissy, et al., filed Mar. 17, 2009 and issued Dec. 14, 2010, is directed to a shield for shielding a structural member from an explosive blast or accidental or malicious destruction. The shield includes a plurality of shield members which include cast ultra high strength concrete, wherein the shield members are capable of being assembled to enclose at least a portion of the structural member to provide protection to the enclosed portion from, for example, an explosive blast. In one embodiment, the shield members include a chassis, at least one ballistic liner disposed on the energy absorbing layer, and a concrete-integrating structure.

SUMMARY OF THE INVENTION

The present invention relates to a ballistic construct, and more specifically to a ballistic construct comprising a ballistic fiberglass mold into which ballistic concrete is poured, where the mold remains part of the construct after curing.

It is an object of this invention to create a stronger ballistic construct compared to ordinary ballistic concrete and for providing ballistic protections on buildings and other structures.

In one embodiment, the present invention includes a bullet-absorbing ballistic construct including a ballistic concrete mixture and a ballistic fiberglass mold, wherein the ballistic concrete mixture includes a grout of cement, fine aggregate, water, a chemical air entrainment additive, and fiber, and wherein the ballistic concrete mixture is cured inside the ballistic fiberglass mold such that the ballistic concrete is bonded to the ballistic fiberglass.

In another embodiment, the present invention includes a bullet-absorbing ballistic construct including a ballistic concrete mixture and a ballistic fiberglass mold, wherein the ballistic concrete mixture includes a grout of cement, fine aggregate, water, chemical air entrainment additive, and fiber, and wherein the ballistic concrete mixture is cured inside the ballistic fiberglass mold such that the ballistic concrete is bonded to the ballistic fiberglass.

In yet a further embodiment, the present invention includes a method for forming a bullet-absorbing ballistic construct constructed with a ballistic concrete mixture and a ballistic fiberglass mold, the method including obtaining a ballistic concrete mixture including (i) about 1 part by mass cement, (ii) about 0.5 to 1.5 part by mass fine aggregate, (iii) about 0.005 to 0.15 part by mass fiber, (iv) about 0.005 to 0.05 part by mass calcium phosphate, (v) about 0.005 to 0.05 part by mass aluminum hydroxide, and (vi) between 0.001 to about 0.05 part by mass air entrainment additive, pouring the ballistic concrete mixture into a ballistic fiberglass mold, and curing the ballistic concrete mixture such that the mixture adheres to the inside of the ballistic fiberglass mold.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3A illustrates a left side view of a ballistic barrier.

FIG. 3B illustrates a right side view of a ballistic barrier.

FIG. 3C illustrates a side view of an upright connecting rod.

FIG. 5A illustrates a left side view of a ballistic barrier including a ballistic fiberglass shield.

FIG. 5B illustrates a right side view of a ballistic barrier including a ballistic fiberglass shield.

DETAILED DESCRIPTION

Figure 1:
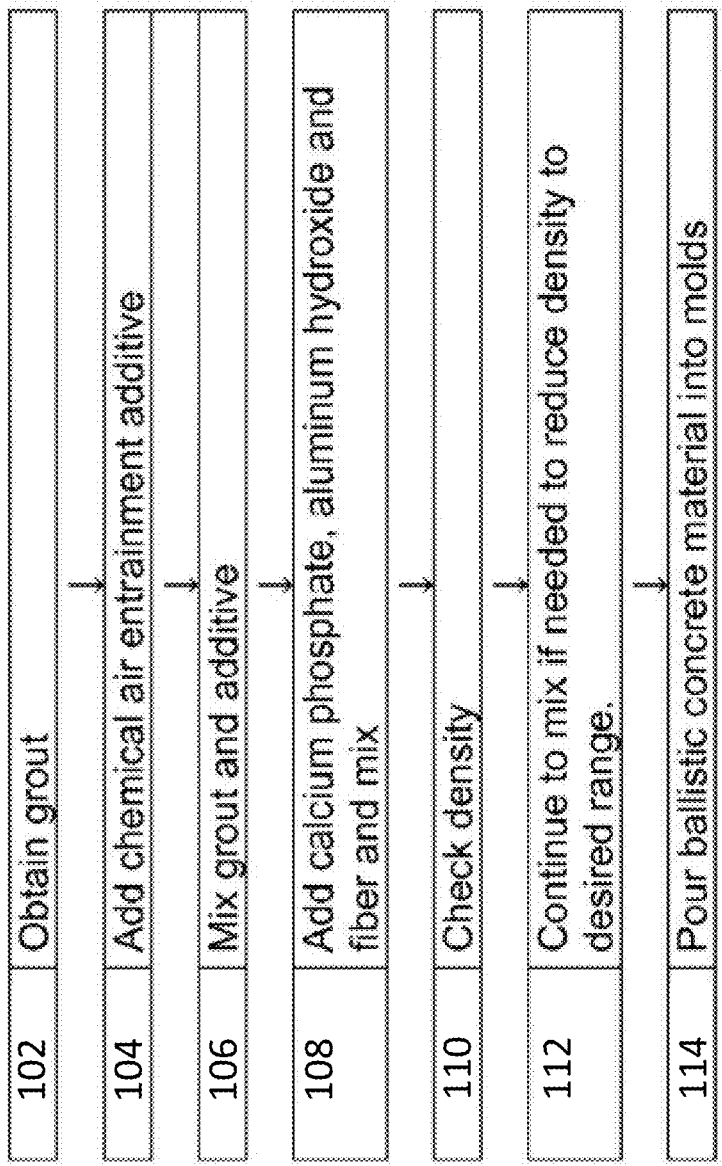
FIG. 1 summarizes a process for making a ballistic construct according to one embodiment of the invention.

The present invention is generally directed to a ballistic construct, and more specifically to a ballistic construct comprising a ballistic fiberglass mold into which ballistic concrete is poured, where the ballistic fiberglass mold remains part of the ballistic construct after curing.

In one embodiment, the present invention includes a bullet-absorbing ballistic construct including a ballistic concrete mixture and a ballistic fiberglass mold, wherein the ballistic concrete mixture includes a grout of cement, fine aggregate, water, a chemical air entrainment additive, and fiber, and wherein the ballistic concrete mixture is cured inside the ballistic fiberglass mold such that the ballistic concrete is bonded to the ballistic fiberglass.

In one embodiment, the ballistic concrete construct is made by pouring the ballistic concrete mixture into the ballistic fiberglass mold with a pour drop of over 2 feet and a maximum pour depth of over 2 feet.

In one embodiment, the ballistic fiberglass mold has a UL-752 rating of at least level-1.

In one embodiment, the ballistic fiberglass includes Aramid, Spectra, Graphite, Basalt, Nomex, Carbon, Cellulose, or Boron fibers.

In one embodiment, the ballistic fiberglass includes glass fibers, where the glass fibers include $SiO_2$, $Al_2O_3$, $B_2O_3$, CaO, or MgO.

In one embodiment, the ballistic fiberglass includes a polyester, polyethylene, polypropylene, vinyl ester, epoxy, polyurethane, bismaleimide, polyimide, or phenolic resin.

In one embodiment, the ballistic fiberglass includes a fiber and a resin, and the ballistic fiberglass mold is between 20% and 70% fiber by weight.

In one embodiment, the ballistic fiberglass mold has a density of 2.9 lbs per ¼"×1'×1'.

In a further embodiment, the present invention includes a bullet-absorbing ballistic construct including a ballistic concrete mixture and a ballistic fiberglass mold, wherein the ballistic concrete mixture includes a grout of cement, fine aggregate, water, chemical air entrainment additive, and fiber, and wherein the ballistic concrete mixture is cured inside the ballistic fiberglass mold such that the ballistic concrete is bonded to the ballistic fiberglass.

In one embodiment, the ballistic fiberglass mold has a thickness of between ¼" and 1".

In one embodiment, the ballistic fiberglass mold includes a fiber and a resin, and the ballistic fiberglass mold is between 20% and 70% fiber by weight.

In one embodiment, the ballistic concrete construct is made by pouring the ballistic concrete mixture into the ballistic fiberglass mold with a pour drop of over 2 feet and a maximum pour depth of over 2 feet.

In one embodiment, ballistic fiberglass mold has a UL-752 rating of at least level-1.

In one embodiment, the ballistic fiberglass mold of the ballistic concrete construct is painted with UV-resistant paint.

In one embodiment, the ballistic fiberglass mold of the ballistic concrete construct is painted with water-resistant paint.

In yet a further embodiment, the present invention includes a method for forming a bullet-absorbing ballistic construct constructed with a ballistic concrete mixture and a ballistic fiberglass mold, the method including obtaining a ballistic concrete mixture including (i) about 1 part by mass cement, (ii) about 0.5 to 1.5 part by mass fine aggregate, (iii) about 0.005 to 0.15 part by mass fiber, (iv) about 0.005 to 0.05 part by mass calcium phosphate, (v) about 0.005 to 0.05 part by mass aluminum hydroxide, and (vi) between 0.001 to about 0.05 part by mass air entrainment additive, pouring the ballistic concrete mixture into a ballistic fiberglass mold, and curing the ballistic concrete mixture such that the mixture adheres to the inside of the ballistic fiberglass mold.

In one embodiment, the ballistic fiberglass mold has a UL-752 rating of at least level-1.

In one embodiment, the ballistic fiberglass mold has a thickness of between ¼" and 1".

In one embodiment, the ballistic fiberglass mold includes $SiO_2$, $Al_2O_3$, $B_2O_3$, CaO, MgO, Aramid, Spectra, Graphite, Basalt, Nomex, Carbon, Cellulose, or Boron fibers.

In one embodiment, the ballistic fiberglass mold includes fiber and resin, and the ballistic fiberglass mold is between 20% and 70% fiber by weight.

None of the prior art discloses a ballistic fiberglass mold which remains part of a ballistic construct after pouring and curing.

Providing bulletproof constructs is essential both for firearms training and for construction of bulletproof buildings. However, designing adequate structure for military training, civilian practice, or for bulletproof buildings has been difficult. Ballistic concrete barriers have been used in firearms training for target practice due to their strength and ability to prevent ricochets, but a stronger barrier is desired. Providing a ballistic fiberglass layer on top of a ballistic concrete core provides such a construct.

Ballistic fiberglass is a combination of fibers and polymer resin. The fibers are preformed into a mat and are immersed in a liquid polymer resin, which then cures with the fibers inside. The resulting construct is greater than the sum of its parts—the resin acts as a binder and a base to the fibers, distributing load, while the fibers provide stiffness and strength.

A layer of ballistic fiberglass is provided as a mold for a ballistic construct. Ballistic concrete is poured into the mold, and on curing, the mold remains around the cured concrete, providing an extra layer of protection.

The ballistic construct comprising an outer fiberglass skin is superior to prior ballistic concrete constructs at least because it provides another layer to deflect or stop incoming projectiles without adding a significant amount of weight to the construct.

The combination of ballistic fiberglass and ballistic concrete yields unexpected benefits that are more than the sum of their parts. The resulting ballistic construct has an impact strength greater than expected.

Ballistic fiberglass is flexible and low-cost when compared to steel. Ballistic fiberglass is lighter than most metals, often offering the same protection for less than half the weight, and additionally ballistic fiberglass does not rust or corrode as metals do.

Furthermore, the ballistic construct made with a ballistic fiberglass mold is easy to position. The fiberglass mold is lightweight and can be preplaced in the location where the ballistic construct will be installed, allowing installers to preview how the construct will look when fixed in place. Another related benefit is that since the ballistic fiberglass mold remains part of the ballistic construct after curing, a user does not need to remove the mold after a lengthy curing period. For example, in the prior art, curing times may take weeks, and a user will have to remove the mold after the curing is complete. However, the present invention does not require additional steps after the ballistic concrete has cured. The lack of additional steps after curing—steps such as the disposal or return shipment of the mold—contributes to the labor saving and low-cost nature of the ballistic fiberglass mold. Once the shipping costs are taken into consideration, ballistic fiberglass is lower cost than steel, even accounting for the fact that ballistic fiberglass molds are a one-time-use mold.

As an additional benefit, ballistic fiberglass is easier to paint than ballistic concrete, which means that the construct can be coated with additional, beneficial layers. In one embodiment, the ballistic fiberglass mold may be coated with a UV-resistant paint, a water-resistant paint, a waterproof paint, or another paint.

Definitions

The term "construct" refers to any item, object, unit, article, or structure made with a ballistic fiberglass mold and ballistic concrete.

The term "ballistic fiberglass" refers to a fiber-reinforced plastic (FRP) or a glass-reinforced plastic (GRP) having a UL-752 rating of at least level-1 (protection of three shots of 124-grain, 9 mm full metal jacket with an FPS between 1175 and 1293).

The term "fiber-reinforced plastic" (FRP) refers to a fiber matrix embedded in a cured resin.

The term "glass-reinforced plastic" (GRP) refers to a fiber matrix embedded in a cured resin, where the fiber is specifically a glass fiber.

The term "very high power" means bullets with a combination of muzzle velocity or mass such that the muzzle energy, $KE=\frac{1}{2} mv2$, is 5,000 foot-pounds (7 kJ) or greater. In some embodiments, the muzzle energy is 10,000 foot-pounds (14 kJ) or greater. In other embodiments, the muzzle energy is between 10,000 foot-pounds (14 kJ) and 15,000 foot-pounds (18 kJ). Non-limiting examples of such bullets include: 647 gr (41.9 g) Speer with a velocity of 3,044 ft/s (928 m/s) and a muzzle energy of 13,144 ft-lb (17,821 J); 655 gr (42.4 g) ADI with a velocity of 3,029 ft/s, energy of 13,350 ft-lbf (18,100 J); or 800 gr (52 g) Barnes with a velocity of 2,820 ft/s and energy of 13,241 ft-lbs (17,952 J). Very high power bullets include the military standard fifty caliber (0.50) bullet used in the Browning machine gun. The bullet would typically be lead, but is not limited to lead. Alternative, non-limiting embodiments include bullets with tracers; internal circuitry for drift correction; explosives; other metals; or metal alloys.

The term "fine aggregate" means natural sand (including quartz, chert, igneous rock and shell fragments), limestone (calcium carbonate), manufactured sand (crushed stone, recycled concrete, slag) ranging from mesh size #8 to #200 (2.4 mm to 0.07 mm). In preferred, non-limiting embodiments the fine aggregate is masonry sand (ASTM C 144) or general concrete sand (ASTM C 33) meeting the size criteria. In one non-limiting embodiment the fine aggregate is saturated surface dry (SSD) material, see ASTM C 128.

The term "fiber" means concrete additives to reinforce the concrete with which includes steel, alkali-resistant glass strands, or synthetic polymers. Fibers used as additives to reinforce concrete are distinct from fibers used to make ballistic fiberglass. In preferred, non-limiting embodiments the fiber is a polyolefin, a polyester, a polyamide, (e.g., Kevlar®, nylon, polyester, polyethylene, polypropylene) or a mixture thereof, which is operable to be a monofilament, fibrillated, or structured fibers (macrofibers). In one embodiment, the fibers meet ASTM C 1116 standards, such as ASTM C 1116 Type III requirements for polypropylene or ASTM C 1116 Type I for steel. Non-limiting examples include Grace Fibers™ (W.R. Grace & Co., Cambridge, Mass.); Nylon—N6600, Polyester—PE7, Polypropylene—CFP1000, Polypropylene—PP7 (Concrete Fibers Inc., Dallas, Tex.); Nycon-MM, NYCON-PVA, Nycon-RECS100, Nycon-RF4000, Nycon-RSC15, Nycon-XL (Nycon Corp., Fairless Hills, Pa.); ENDURO® 600, Fibercast® 500 for Precast, Fibercast® 510, Fibermesh® 150, Fibermesh® 300, Fibermesh® 650, Novocon® 1050, Novocon® XR, Novomesh® 850, Novomesh® 950 (Propex Concrete Systems Corp., Chattanooga, Tenn.); PSI Fibers™ (PSI Packaging, LaFayette, Ga.). Additional examples of suitable fibers include fibers described in U.S. Pat. No. 5,456,752 (Hogan); U.S. Pat. No. 6,423,134 (Trottier et al.); U.S. Pat. No. 6,582,511 (Velpari); or U.S. Pat. No. 6,758,897 (Rieder et al.), the contents of which are hereby incorporated by reference in their entirety.

The term "air entrainment additive" means admixtures that are part of the concrete mix to incorporate air bubbles of controlled sizes in the concrete matrix. These admixtures stabilize the air bubbles entrained during the mechanical mixing of concrete by the mixer blades. Advantageously, using air entrainment additives provides for more consistent air bubble distribution within the mixture. The air entrainment additives of the present invention are mixed thoroughly within the concrete mixture, and the present invention does not require an air pump or a similar device to create air bubbles within the mixture. Rather, the air entrainment additive causes a chemical reaction which creates air bubbles within the mixture much more consistently than SACON®. An issue with SACON® is that the foaming agent used in creating SACON® often does not distribute evenly, and thus there are areas which do not have foam. SACON® therefore does not have a proper consistency for creating an effective ballistic barrier and areas where the SACON® does not have foam often fail upon impact from projectiles. Examples of air entrainment additives include, but are not limited to, DaraFill® Dry or wet DaraFill formulations (W.R. Grace & Co.), Rheocell® Rheofill™ (BASF Construction Chemicals, Cleveland, Ohio), Micro Air® (BASF Construction Chemicals), EUCON EASY FILL (Euclid Chemical Co., Cleveland, Ohio), Fritz-Pak Fill Flow (Fritz-Pak, Dallas, Tex.). Additional examples of air entrainment additives are found in U.S. Pat. No. 4,488,910 (Nicholson et al.); U.S. Pat. No. 4,737,193 (Gutmann et al.); U.S. Pat. No. 4,249,948 (Okada et al.); U.S. Pat. No. 4,046,582 (Kawamura et al.); or the Portland Cement Association publication entitled "Manual on Control of Air Content in Concrete" (PCA EB116), the contents of which are hereby incorporated by reference in their entirety.

Air Entrainment Additives

Air entrainment additives generally include a surfactant. The surfactant is operable to be rosin-based or non-rosin-based. Other air-entraining materials, such as perlite, are also operable to be used. In one embodiment, the air entrainment additive is comprised of a mixture of fatty alkanolamide, diethanolamine, perlite, and quartz dust. For example, the composition of some common air entraining additives follow:

DARAFILL—fatty alkanolamide 60% w/w, diethanolamine 4% w/w, perlite 60% w/w, quartz (crystalline silica) 0.50% w/w.

RHEOCELL RHEOFILL—Sulfonic acids, C14-16-alkane hydroxy and C14-16-alkene, sodium salts 75-100%; Benzenesulfonic acid, dimethyl-, sodium salt 5.0-15.0%.

Micro Air (hazardous ingredients only)—Alpha-olefin sulfonate 1-5% w/w; potassium hydroxide 1-5% w/w, rosin 0-1.0% w/w.

EUCON EASY FILL—Sodium (C14-16) Olefin Sulfonate 125-50% w/w

The term "depth of penetration" with respect to a bullet penetration into a barrier is measured by inserting a measuring implement into the hole formed by the bullet and measuring from the point of entry to the trailing end of the bullet. Thus, the maximum penetration is actually a bit deeper than the measured penetration as the bullet, while altered in shape from the impact, has a non-zero length. The depth of penetration of bullets into the absorbing material is operable to be measured using alternative methods known to those skilled in the art. Laser based tools such as a laser range finder are also used.

Referring now to the drawings in general, the illustrations are for the purpose of describing one or more preferred embodiments of the invention and are not intended to limit the invention thereto.

Manufacturing Process

In a non-limiting formulation, cement, fine aggregate, and water are mixed to form a grout. In one embodiment, the grout is obtained from a ready-mix concrete supplier.

Next, an air entrainment additive is mixed into the grout. Then calcium phosphate, aluminum hydroxide, and fiber are added. After mixing for a number of minutes the density is checked.

If the mixture is above the optimal density, additional mixing adds additional entrained air bubbles to reduce the density. The process of measuring density and providing additional mixing is repeated until the measured density is within a target range of the optimal density.

When the density is deemed appropriate, the ballistic concrete is poured into molds to form the ballistic construct. Typically, the ballistic concrete is allowed to harden and cure for at least four weeks. Batching, mixing, transporting, testing, curing, and placing the ballistic concrete would preferably meet the standards described in the Army Corp. of Engineers guidelines "Technical Specification for Shock Absorbing Concrete (SACON®)":

AMERICAN CONCRETE INSTITUTE (ACI) STANDARDS

ACI 117 (1990) Standard Specifications for Tolerances for Concrete Construction and Materials ACI 301 (1999) Standard Specification for Structural Concrete ACI 304R (2000) Guide for Measuring, Mixing, Transporting, and Placing Concrete ACI 305R (1999) Hot Weather Concreting ACI 306R (1997) Cold Weather Concreting ACI 544.1R (1996) State-of-the-Art Report in Fiber Reinforced Concrete ACI 544.2R (1999) Measurement of Properties of Fiber Reinforced Concrete

AMERICAN SOCIETY FOR TESTING AND MATERIALS

ASTM C 33 (2001) Standard Specification for Concrete Aggregate

ASTM C 39 (2001) Standard Test Method for Compressive Strength of Cylindrical Concrete Specimens ASTM C 94 (2000) Standard Specifications for Ready-Mixed Concrete ASTM C 138 (2001) Standard Test Method for Density (Unit Weight), Yield, and Air Content (Gravimetric) of Concrete ASTM C 144 (2002) Standard Specification for Aggregate for Masonry Mortar ASTM C 150 (2002) Standard Specification for Portland Cement ASTM C 171 (1997) Standard Specification for Sheet Materials for Curing Concrete ASTM C 172 (1999) Standard Practice for Sampling Freshly Mixed Concrete ASTM C 567 (2000) Standard Test Method for Unit Weight of Structural Lightweight Concrete ASTM C 1116 (2002) Standard Specification for Fiber-reinforced Concrete and Shotcrete

US ARMY CORPS OF ENGINEERS HANDBOOK FOR CONCRETE AND CEMENT (CRD)

CRD-C 400 (1963) Requirements for Water for Use in Mixing or Curing Concrete

NATIONAL READY-MIXED CONCRETE ASSOCIATION (NRMCA)

NRMCA QC 3 (Jan. 1990; 9th Rev) Quality Control Manual: Section 3, Plant Certifications Checklist: Certification of Ready-Mixed Concrete Production Facilities NRMCA CPMB 100 (Jan. 1990; 9th Rev) Concrete Plant Standards NRMCA TMMB 1 (1989; 13th Rev) Truck Mixer and Agitator Standards The cement used would preferably be ASTM C 150 Type 1-II. The fine aggregate is operable to be masonry sand (ASTM C 144), or general concrete sand (ASTM C 33).

The calcium phosphate is operable to be granulated bone meal, bone ash, or precipitated calcium phosphate. In one non-limiting embodiment, it is technical grade or higher. The aluminum phosphate is operable to be metakaolinite or precipitated aluminum hydroxide. In one non-limiting embodiment, it is technical grade or higher.

One of skill in the art of ballistic concrete manufacturing would recognize that these materials are prepared on industrial scale and accordingly quantities and proportions may vary in accordance with industry norms. In addition, one skilled in ballistic concrete manufacturing would recognize that materials may be measured by volume or by timed delivery from a storage container.

The following examples further illustrate the various teachings of the disclosure and are not intended to limit the scope of the claimed invention.

The ballistic concrete mix comprises:
(a) about 1 part by mass cement;
(b) about 0.5 to 1.5 part by mass fine aggregate;
(c) about 0.005 to 0.15 part by mass fiber;
(d) about 0.005 to 0.05 part by mass calcium phosphate;
(e) about 0.005 to 0.05 part by mass aluminum hydroxide; and
(f) about 0.0005 to 0.05 part by mass air entrainment additive.

In one non-limiting embodiment, the ballistic concrete mix comprises
(a) about 0.8 to 1.2 part by mass fine aggregate;
(b) about 0.008 to 0.012 part by mass fiber;
(c) about 0.008 to 0.012 part by mass calcium phosphate;
(d) about 0.008 to 0.012 part by mass aluminum hydroxide; and
(e) about 0.0008 to 0.002 part by mass air entrainment additive.

In another non-limiting embodiment, the ballistic concrete mix comprises
(a) about 0.9 to 1.1 part by mass fine aggregate;
(b) about 0.009 to 0.011 part by mass fiber;
(c) about 0.009 to 0.011 part by mass calcium phosphate;
(d) about 0.009 to 0.011 part by mass aluminum hydroxide; and
(e) about 0.0009 to 0.0015 part by mass air entrainment additive.

The mixture comprising the cement, the fine aggregate, the fiber; the calcium phosphate, the aluminum hydroxide, and the air entrainment additive may be mixed until the mixture has a density within a range of 88 to 94 pounds per cubic foot. In another embodiment the mixture has a density of 104 pounds per cubic foot. The teachings of the present disclosure may be used to create a ballistic concrete without the use of the calcium phosphate and aluminum hydroxide if lead-leaching control is not an objective.

In one non-limiting embodiment, the fiber may be a polyolefin fiber, which may or may not be fibrillated. In another embodiment the air entrainment additive is Dara-Fill® Dry.

The ballistic concrete may have air bubbles resulting from the air entrainment additive that are less than about 0.04 inches (1 mm) in diameter. Alternatively, the ballistic concrete may have air bubbles resulting from the air entrainment additive that are greater than 0.0004 inches (10 microns) in diameter. In another non-limiting embodiment, the ballistic concrete has air bubbles resulting from the air entrainment additive that are less than about 0.04 inches (1 mm) in diameter and greater than 0.0004 inches (10 microns) in diameter.

The training with the live ammunition may be performed with at least one of the following types of weapons:

.22 caliber weapon, .38 caliber weapon, .40 caliber weapon, .45 caliber weapon, .50 caliber weapon, 5.56 mm weapon, 6.8 mm weapon, 7.62 mm weapon, 9 mm weapon or a grenade or other fragmentation device.

Preparation of Ballistic Concrete for Use with Live Fire Ammunition

The ingredients for making the ballistic concrete are as follows:

Amount per unit ballistic concrete in Ingredient English System Metric System: Cement 972 pounds (441 kilograms); Fine Aggregate (SSD) 972 pounds (441 kilograms); Water 466 pounds (211 kilograms); Calcium Phosphate 9.72 pounds (4.41 kilograms); Aluminum Hydroxide 9.72 pounds (4.41 kilograms); DaraFill® Dry 11.4 ounces (323 grams); Grace Fibers™ 14.8 pounds (6.71 kilograms).

FIG. 1 summarizes a process for making ballistic concrete. As noted below, some of the steps may be performed in slightly different orders but for sake of clarity, it is useful to introduce one sequence of steps for discussion rather than muddy the water with premature digressions on alternatives. The steps may be summarized as follows:

Step 102—Obtain a grout of cement, fine aggregate, and water in a mixer in accordance with ACI standard 304R and/or ASTM standard C 94. The act of obtaining includes creating the grout or obtaining the grout from some third party.

Step 104—Add a chemical air entrainment additive (DaraFill® Dry, W. R. Grace & Co.).

Step 106—Following the addition of the additive, mix the grout for five minutes. Mixing may be achieved by rotating the drum on a cement mixer truck.

Step 108—Add Calcium Phosphate, Aluminum Hydroxide, and fiber. One suitable fiber is Grace Fibers™. Mix for an additional ten minutes.

Step 110—Check density such as by weighing using a ¼ cubic foot testing pot. Target weight is 22.7 pounds (approximately 91 pounds per cubic foot) as the actual target is 91 pounds per cubic foot+/−3 pounds per cubic foot.

Step 112—Continue to mix if needed to reduce density to desired range. Additional mixing lowers the density. Continue to mix, checking frequently, until target density is achieved. The target wet density material when poured into components is 1458 kg/m$^3$ (91-pounds per cubic foot+/−3 pounds per cubic foot).

Step 114—Pour ballistic concrete into mold. As with traditional SACON® type ballistic concrete, vibration such as may be used with standard structural concrete is to be avoided to minimize destruction of air bubbles.

Changes in Order and Additives

Note that the step of adding the calcium phosphate and aluminum hydroxide could be done at the same time as adding the chemical air entrainment additive.

Note further, that as the calcium phosphate and aluminum hydroxide are added to reduce lead-leaching from ballistic concrete blocks which have absorbed ammunition with lead components; these chemicals are not central to the ballistic properties of the ballistic concrete. Thus, in applications where the need to reduce lead-leaching is not important (whether because of local rules, post use disposal plans, or a movement to ammunition with minimal or no lead), one can make ballistic concrete in accordance with the teachings of the present disclosure without addition of calcium phosphate or aluminum hydroxide.

The fiber may be added at the same time as the chemical air entrainment additive (and possibly the calcium phosphate and aluminum hydroxide) as this process does not require achieving a pre-fiber density before adding the fiber. When the process is modified so that there is not a need to add material after five minutes of mixing, simply mix for fifteen minutes before checking density. Additional mixing may be required to reduce density.

Less Restrictions on Pouring

Unlike traditional SACON type ballistic material with fragile foam bubbles, ballistic material made in accordance with the teachings of the present disclosure is not limited to a 2-foot maximum drop during pouring or a 2-foot maximum depth of a pour. Thus, unlike traditional SACON type ballistic material, ballistic material made in accordance with the teachings of the present disclosure is operable to be poured into molds oriented in their final vertical orientation. Accordingly, ballistic material made in accordance with the teachings of the present disclosure is operable to be poured into molds with pour heights well in excess of 2 feet tall. Pours of greater than 3 feet in height are obtainable. Pours of greater than 6 feet in height are obtainable. Pours of greater than eight feet in height from bottom to top of a mold are obtainable. Pour structures of full height walls of eight feet or more are operable to be made as well.

Cement sets when mixed with water by way of a complex series of chemical reactions still only partly understood. The different constituents slowly crystallize and the interlocking of their crystals gives cement its strength. When fresh cement is poured over cement that has already hardened, the crystal cannot interlock as thoroughly as a single pour. Thus, the present invention provides for taller constructs that are stronger because they are integrally-formed in a single pour.

In an alternate embodiment, the cement is a different kind of cement.

The manufacturing process for ballistic concrete is further described in US Patent Pub. No. 2020/0340784 and in U.S. Pat. No. RE48502E1 by common assignee 360° Ballistics LLC and is incorporated herein by reference.

Ballistic Fiberglass

A glass-reinforced plastic (GRP) is a glass fiber matrix embedded in a cured resin. Glass fibers are created by melting glass and extruding it under high pressure. The resulting strands are known for their high tensile strength, fire resistance, thermal insulation, durability, and low price. The glass fiber strands may be combined with a resin, creating a glass-reinforced plastic. The resin acts as a binder and a base to the brittle glass fibers, with the fibers providing stiffness and strength and the resin distributing load and protecting against the environment, creating a material that is more than the sum of its parts. A fiber-reinforced plastic (FRP) does not require fiberglass specifically but is the combination of resin and any fiber generally. A GRP is therefore a specific kind of FRP where the fiber is a glass fiber. "Fiberglass" is commonly used to refer to both glass fibers on their own and to fiber-reinforced plastics incorporating glass fibers, but in this specification, "ballistic fiberglass" is used to refer to either FRPs or GRPs rated at a UL-752 rating of at least level-1 (protection of three shots of 124-grain, 9 mm full metal jacket with an FPS between 1175 and 1293).

In one embodiment, the ballistic fiberglass mold is obtained premade. In another embodiment, the ballistic fiberglass mold is manufactured by the user according to their particular use case.

Ballistic fiberglass manufacturing comprises two main steps: forming the fibers and bonding them into a polymer matrix. In one embodiment the fibers are glass fibers and are formed by melting glass and extruding it under high pressure. In a further embodiment the glass is a powder. In another embodiment the fibers are E-glass, S-glass, quartz, Aramid, Spectra, Graphite, basalt, Nomex, carbon, cellulose, or Boron. In yet another embodiment the fibers are another kind of fiber. In one embodiment the fibers are obtained pre-made. The fibers are then made into fiber preforms by weaving, knitting, braiding, or stitching the fibers together into a sheet, mat, or other structure. The second step, bonding the fibers into a polymer matrix, is accomplished by placing the fiber preform into a mold and by wetting the preform with resin. The product is then cured in the mold so the fiber preform and resin form the shape of the mold. In one embodiment the ballistic fiberglass mold comprises multiple layers of fiber preform. In another embodiment, the ballistic fiberglass is manufactured by means of pultrusion. In another embodiment, the ballistic fiberglass mold is manufactured by any manufacturing method.

The resins used in ballistic fiberglass can be a wide variety of plastics, each of which will add unique characteristics to the final product. Some non-limiting examples of resins commonly used in ballistic fiberglass include polyester, polyethylene, polypropylene, vinyl ester, epoxy, polyurethane, bismaleimide, polyimide, and phenolic. The resins begin as a liquid but polymerize and harden during the curing process, trapping fibers inside.

Ballistic fiberglass may be either two-dimensional or three-dimensional. In two-dimensional ballistic fiberglass, fibers only align along the x- and y-directions of the material, and none are oriented in the thickness, or z-direction. In three-dimensional ballistic fiberglass, fibers are aligned in the x-, y-, and z-directions, improving impact tolerance compared to two-dimensional ballistic fiberglass. In one embodiment, the ballistic fiberglass is a two-dimensional ballistic fiberglass. In another embodiment, the ballistic fiberglass is a three-dimensional ballistic fiberglass.

In one embodiment the fibers are glass fibers. The glass fibers used in ballistic fiberglass vary by application. Some examples of glasses used include $SiO_2$, $Al_2O_3$, $B_2O_3$, CaO, and MgO. Powders are heated until they melt and are then extruded to form glass fibers. The glass fibers typically have small diameters in the range of 3 to 20 micrometers.

The weight ratio of fibers to resin can vary depending on application, with higher percentages of fiber providing greater strength and stiffness. In one embodiment, the ballistic fiberglass comprises 20% fiber and 80% resin by weight. In another embodiment, the ballistic fiberglass comprises 70% fiber and 30% resin by weight. In yet another embodiment, the proportion of fiber by weight is between 20% and 70%. In a further embodiment, fillers, additives, and/or modifiers are used.

In an alternative embodiment, a reinforcement in ballistic fiberglass can be traditional glass fibers, chopped glass, woven glass, or microspheres.

Ballistic fiberglass is flexible and low-cost when compared to other materials such as steel. While ballistic fiberglass tends to have higher up-front costs, it balances this with a lower lifecycle cost of maintenance and repairs. Ballistic fiberglass is more durable than metals and compares favorably to steel in that it does not rust or corrode. Furthermore, ballistic fiberglass is lighter than steel, often able to offer the same protection for less than half the weight. In one embodiment, the ballistic fiberglass mold does not contain steel. In another embodiment, the ballistic fiberglass mold does not contain wood.

In addition to the durability and low weight, ballistic fiberglass has other advantages. A ballistic fiberglass mold that remains a part of a ballistic construct after curing is easier to handle logistically than a mold that has to be removed. Since the ballistic fiberglass mold remains part of the ballistic construct, the mold may be shipped to the location where the ballistic construct is to be installed, and filled on location. No secondary shipping or return of the mold is required since it remains a part of the construct. Once the shipping costs are taken into consideration, ballistic fiberglass is lower-cost when compared to steel, even accounting for the fact that a ballistic fiberglass mold is a one-time use mold. Additionally, ballistic fiberglass molds save labor compared to prior art molds, since they do not have to be stripped off and returned or disposed after the concrete cures.

Bullet Resistance of Fiberglass

Ballistic fiberglass provides for very efficient energy dispersion because it delaminates when impacted. Energy from an object impacting a ballistic fiberglass layer is transmitted through the resin across the entire layer and is dissipated as the ballistic fiberglass layer comes apart. The ballistic fiberglass may crack and break but will stop an incoming object such as a bullet.

Ballistic fiberglass makes a good outer layer for a ballistic construct because of its impact resistance and because of its low weight. Ballistic fiberglass can be added to a concrete construct without significantly increasing the construct's weight, improving the construct with little in the way of tradeoffs.

Aesthetically, the ballistic construct looks like it is made from ballistic fiberglass. In one embodiment, the ballistic fiberglass mold is painted. Ballistic fiberglass is typically coated with either a polyester or epoxy paint, both for aesthetic purposes and to protect the fiberglass from water and the sun. The choice of the paint depends on the kind of plastic used for the resin—polyester paints bond best to polyester resins, and epoxy paints bond best to epoxy resins. In one embodiment, the paint used is epoxy-based. In another embodiment, the paint used is polyester-based. In yet another embodiment, the paint is vinyl ester based. In a further embodiment the paint used is resistant to UV light. In another embodiment the paint used has another protective quality.

Ballistic Fiberglass Repair

When ballistic fiberglass is damaged, a crack, hole, or other damaged area can be repaired by adding another layer of ballistic fiberglass on top of the defect. A fiber preform is placed over the area to be reinforced, and new resin is added. When the new resin cures with the fiber preform inside, the defect is patched. However, repairs differ from the original material because they have only a secondary bond instead of a primary bond. When the ballistic fiberglass is first cured, the resin forms a single part, while when the repair patch is added, it is a secondary piece adhered to the primary structure and is therefore a weaker bond. In one embodiment, a ballistic construct's ballistic fiberglass mold is repaired after being damaged.

Ballistic Fiberglass Mold Design

Ballistic fiberglass also allows for flexibility of design. Ballistic fiberglass can be formed into a large variety of shapes, allowing a larger design space than for molds made from other materials. In one embodiment, the ballistic fiberglass is used to form a mold and not a panel, liner, skin, or removable protection. In one embodiment, the ballistic fiberglass is not laminated, mechanically attached, or attached by means of adhesive to the surface of ballistic concrete, but is instead bonded to the ballistic concrete when the ballistic concrete cures. The flexibility of ballistic fiberglass allows for the construction of molds in unique or special shapes. The following examples are meant to be illustrative rather than limiting.

In one embodiment the ballistic fiberglass is used to make one or more molds for a small modular structure. In a further embodiment, the small modular structure is a guard house, a new safe room, a retrofitted safe room, an entrance vestibule, an above-ground or below-ground sensitive compartmented information facility, an ammunition storage depot, a fuel storage depot, a riot control barrier, a modular shoot house panel, a secure locker, a decorative protection, or another small structure.

In one embodiment the ballistic fiberglass is used to make one or more molds for a large structure. In a further embodiment, the large structure is an embassy, a consulate, a government building, a municipal building, a secure access structure, a structure requiring DoD Antiterrorism Standard Protection, a police station, or another large structure.

In one embodiment the ballistic fiberglass is used to make one or more molds for living or working quarters. In a further embodiment, the living or working quarters is a ballistic safe garage, a ballistic safe home, a ballistic safe office space, an above-ground sensitive compartmented information facility, or other structure.

In one embodiment the ballistic fiberglass is used to make one or more molds for a perimeter security structure. In a further embodiment, the perimeter security structure is a wall system, a hostile vehicle mitigation, a protection for power infrastructure, a movable barrier wall system, or other perimeter security structure.

In one embodiment the ballistic fiberglass is used to make one or more molds for a subterranean facility. In a further embodiment the subterranean facility is a secure sub-T complex, a bomb shelter, a below-ground sensitive compartmented information facility, or other subterranean facility.

The ballistic fiberglass is further operable to be used to make one or more molds for objects of varying shapes and sizes. For example, a ballistic fiberglass mold may be used to make a chair, a table, a desk, or other furniture objects.

In another embodiment, the ballistic construct is structural and is not merely added to existing buildings or objects to retrofit them.

Physical Dimensions of Ballistic Barrier

The dimensions of one embodiment of a ballistic construct are described below and are not intended to be limiting. It will be understood by one of skill in the art that the ballistic barrier described below is only one example of a construct that may be made with the ballistic concrete and ballistic fiberglass mold of the present invention.

Figure 2:
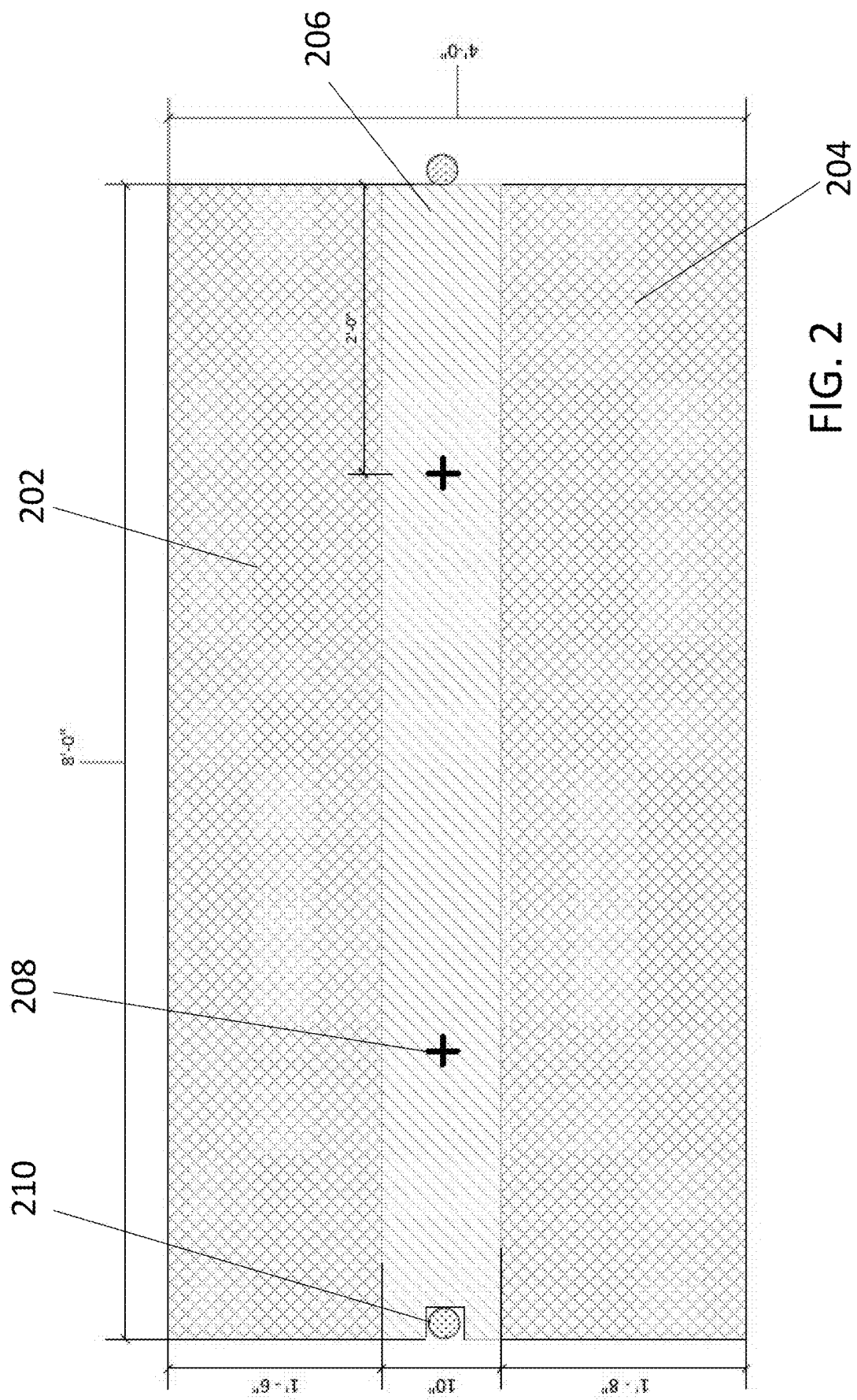
FIG. 2 illustrates a top-down view of a ballistic barrier.

FIG. 2 shows a top-down view of a ballistic barrier separated into three parts: a front protrusion 202, a back protrusion 204, and a central wall 206. In one embodiment the central wall 206 is 10" (ten inches) thick with picking points 208 located 2' (two feet) inwards from either of a first and a second side edge. A picking point is a location from which the ballistic barrier may be raised or lowered to distribute weight evenly during raising or lowering.

In one embodiment the front protrusion 202 is 1'6" (one foot and six inches) thick. In one embodiment the back protrusion 204 is 1'8" (one foot and eight inches) thick. The width of the ballistic barrier may be varied in order to change the mold's weight. In one embodiment the ballistic barrier is between 2' (two feet) and 8' (eight feet) wide.

In one embodiment, the central wall further comprises pipe rings 210. In a further embodiment, the central wall 206 further comprises pipe rings with diameters of 2.5" (two and a half inches), on both the first side edge and the second side edge. In another embodiment the central wall does not have pipe rings.

The heights of the central wall 206, the front protrusion 202, and the back protrusion 204 can be seen in FIGS. 3A and 3B. The back protrusion 204 is rectangular and is 8" (eight inches) high. The front protrusion 202 is roughly triangular in shape with one truncated point, creating a face parallel 302 to the central wall 206. The front protrusion 202 further comprises an angled face 304 at 36 degrees. In another embodiment the front protrusion has a different angle. The angled face 304 of the front protrusion provides extra protection by angling projectiles away from the ballistic barrier. The front protrusion reduces the chances of scaling, blunt force damage from ramming, and provides stability to the ballistic barrier. The face parallel 302 to the central wall 206 is 3" (three inches) high, and the angled face 304 is 1'10" (one foot and ten inches) in length. The angled face 304 connects the parallel face 302 to the central wall 206, and intersects the central wall 1'4" (one foot and four inches) from the base of the central wall. The bases of the back protrusion 204, front protrusion 202, and central wall 206 are substantially flat and coplanar, making a single bottom surface 4' (four feet) thick.

In one embodiment the central wall further comprises a portal. The portal is transparent and enables a user to look through the portal to see what is on the other side without poking the user's head around the edge of the ballistic barrier, exposing themselves to projectiles. In a further embodiment, the portal comprises ballistic glass at a UL-752 level-5 rating.

In one embodiment, the ballistic barrier comprises five pipe rings, with three pipe rings on the first side edge of the central wall and two pipe rings on the second side edge. The three pipe rings on the first side edge are spaced 7" (seven inches), 3'6" (three feet and six inches), and 6'4" (six feet and four inches) from the top of the central wall. The two pipe rings on the second side edge are spaced 2' (two feet) and 5' (five feet) from the top of the central wall. A pipe ring comprises a ring attached to a 1'6" (one foot and six inches) long rod. The rod of the pipe ring is embedded into the ballistic barrier and the ring of the pipe ring is oriented parallel to the ground. In one embodiment, the pipe rings have oval shaped openings. In another embodiment, the pipe rings have circular shaped openings.

FIG. 3C shows a connecting rod 306 which is used to connect two adjacent ballistic barriers. A connecting rod comprises a 6' 11½" (six feet and eleven and a half inches) shaft 308 with a diameter of 1" (one inch), and a ½" (half inch) long handle 310 that is oriented perpendicular to, and is connected to, the shaft, for a total length of 7' (seven feet). In one embodiment the total length of the connecting rod is the same as the height of the ballistic barrier. The handle of the connecting rod is oriented such that it forms a "T"-shaped top for the shaft. In one embodiment the handle is cylindrical. In another embodiment the handle is shaped like a disk. The end of the connecting rod opposite from the handle is inserted into the pipe ring opening. The connecting rod slides vertically into the pipe rings. The handle is at least 2½" (two and a half inches) wide, sufficient to prevent the handle from being inserted into a pipe ring opening. Adjacent barriers are connected by sliding the connecting rod through the barriers' pipe rings. The connecting rod and pipe rings provide lateral strength, ensuring that a force ramming at a junction between the two barriers will be absorbed by the barriers rather than resulting in a breach. In one embodiment, the shaft of the connecting rod is cylindrical. In another embodiment, the shaft is the same shape as the pipe ring openings.

In another embodiment, the ballistic barrier does not comprise pipe rings and instead at least two adjacent ballistic barriers are connected by other means. Methods of attachment include mechanical interlocking, mechanical fasteners, adhesives, and/or other methods of attachment.

Figure 4B:
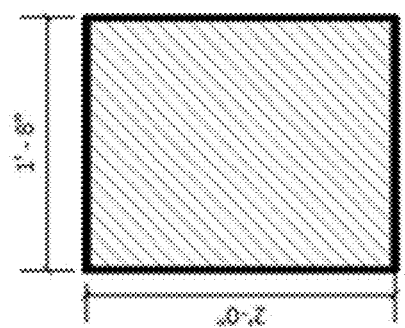
FIG. 4B illustrates a side view of a counterweight.
Figure 4C:
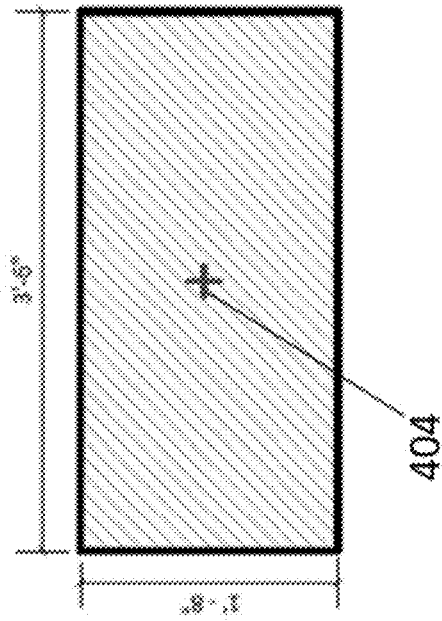
FIG. 4C illustrates a top-down view of a counterweight.
Figure 4A:
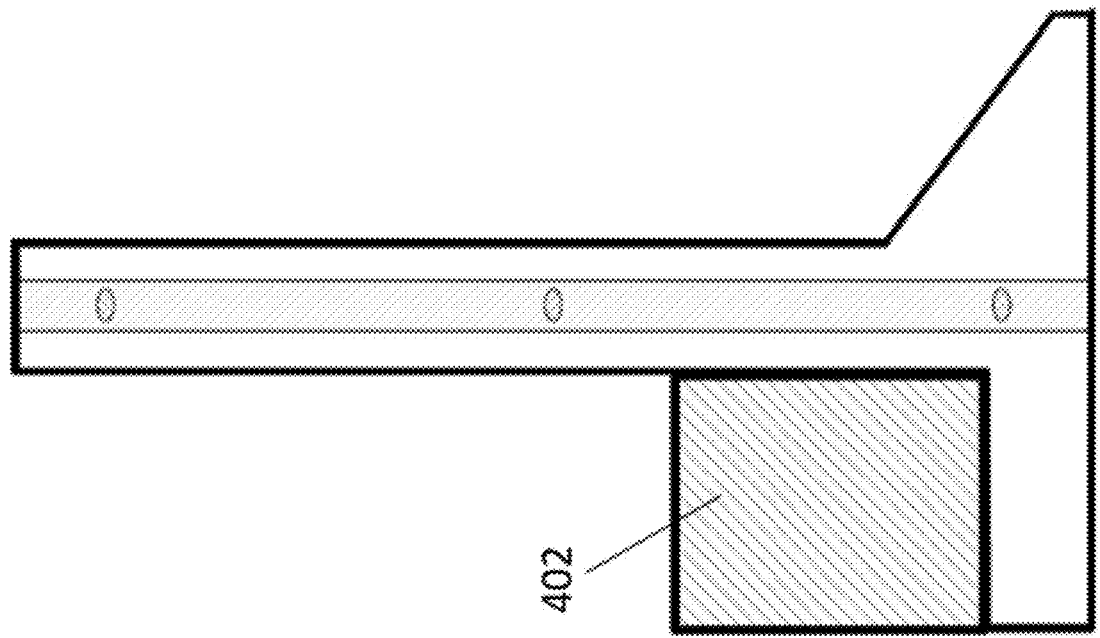
FIG. 4A illustrates a side view of a ballistic barrier including a counterweight.

For increased stability, in one embodiment a counterweight 402 is provided. FIG. 4A shows the counterweight 402 placed on top of the back protrusion 204 of the ballistic barrier. The counterweight is 2' (two feet) tall, 1'8" (one foot and eight inches) thick, and 3'6" (three feet and six inches) wide, as shown in FIGS. 4B and 4C. The counterweight additionally has a picking point 404 located at the center of its top surface, as shown in FIG. 4C. In one embodiment the counterweight has different dimensions. In one embodiment, the counterweight weighs between 1,500 and 9,500 lbs. In another embodiment, the counterweight has a density of 104 lbs/square foot.

In one embodiment, the central wall, front protrusion, and back protrusion are made from a ballistic cement mixture. The ballistic cement mixture is poured into a ballistic fiberglass mold and allowed to cure to form the ballistic barrier. The cured cement adheres to and remains affixed to the inside of the ballistic fiberglass mold, becoming a single piece comprising a ballistic concrete core and a ballistic fiberglass coating.

The ballistic barrier is surrounded by a layer of ballistic fiberglass 502, as shown in FIGS. 5A and 5B. In one embodiment, the ballistic fiberglass covering the front of the ballistic barrier is a shield ¼" (quarter inch) thick. In another embodiment, the ballistic fiberglass covering the front of the ballistic barrier is a shield 1" (one inch) thick. The ballistic fiberglass covering the side and back faces of the ballistic barrier are only as thick as necessary to make a mold to pour ballistic concrete into. In one embodiment, the ballistic fiberglass covering the side and back faces of the ballistic barrier is ¼" (quarter inch) thick. In another embodiment, the ballistic fiberglass covering the side and back faces of the ballistic barrier is 1" (one inch) thick. In yet another embodiment, the thickness of the ballistic fiberglass is between ¼" (quarter inch) and 1" (one inch).

In one embodiment, the ballistic barrier weighs approximately 4,850 lbs. In one embodiment the ballistic concrete has a density of 29 lbs per 5½"×1'×1' and the ballistic fiberglass has a density of 2.9 lbs per ¼"×1'×1'. In another embodiment the ballistic concrete has a density of 104 lbs per cubic foot.

In one embodiment, the ballistic fiberglass has a weight of 2.9 lbs per ¼"×1'×1'. The ballistic fiberglass has a Level-1 ballistic rating in accordance with UL-752 11$^{th}$ Edition. The ballistic fiberglass is munition tested with 9 mm Full Metal, 124 Grain, 1175-1293 fps, 3 shots. The ballistic fiberglass has a fire rating of 1 hour rated to ASTM E119-00a.

In one embodiment, the ballistic concrete mix is a ballistic concrete with a weight of 29 lbs per 5½"×1'×1'. The ballistic concrete has a Level-10 ballistic rating in accordance with UL-752 11$^{th}$ Edition. The ballistic concrete is munition tested with 0.50 Ca, 709.5 grain, FMC, 2810 fpx, 1 shot. The ballistic concrete has a fire rating of over five hours to ASTM E119-00a.

In another embodiment the shape and dimensions of the ballistic barrier vary.

Buildings Made from Ballistic Fiberglass Molds

One embodiment of a building constructed using ballistic fiberglass molds is described below and is not intended to be limiting. It will be understood by one of skill in the art that the building described below is only one example of a structure that may be made with the ballistic concrete and ballistic fiberglass mold of the present invention.

Figure 6:
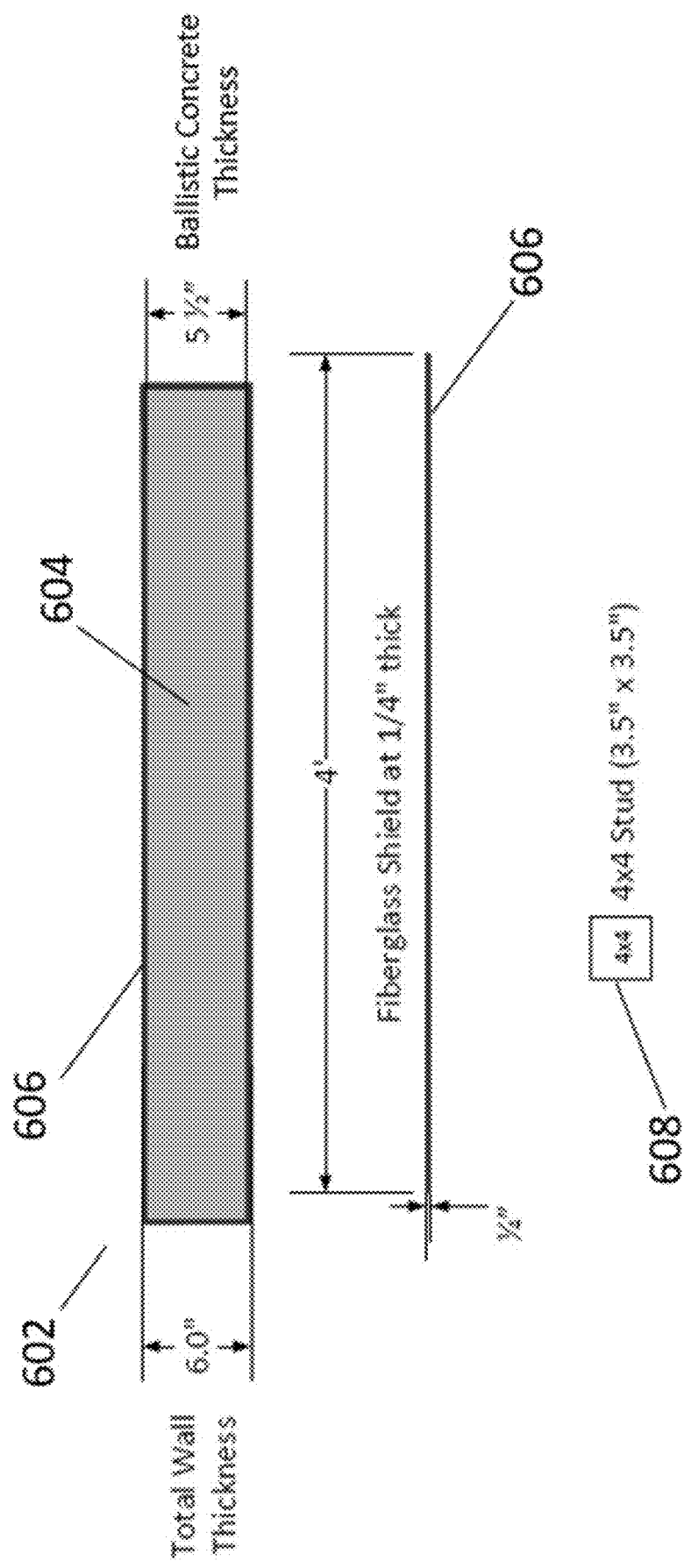
FIG. 6 illustrates the thickness of a ballistic construct with a ballistic fiberglass shield.

In one embodiment, ballistic constructs are used as the structure of a building. In the embodiment shown in FIG. 6, the total thickness of the ballistic construct 602 is 6" (six inches), with the ballistic concrete 604 being 5½" (five and a half inches) thick and the ballistic fiberglass shield layer 606 on each side of the wall being ¼" (quarter inch) thick.

In one embodiment, 4×4 studs 608 are provided which have dimensions of 3.5" by 3.5" by 8'.

Figure 7:
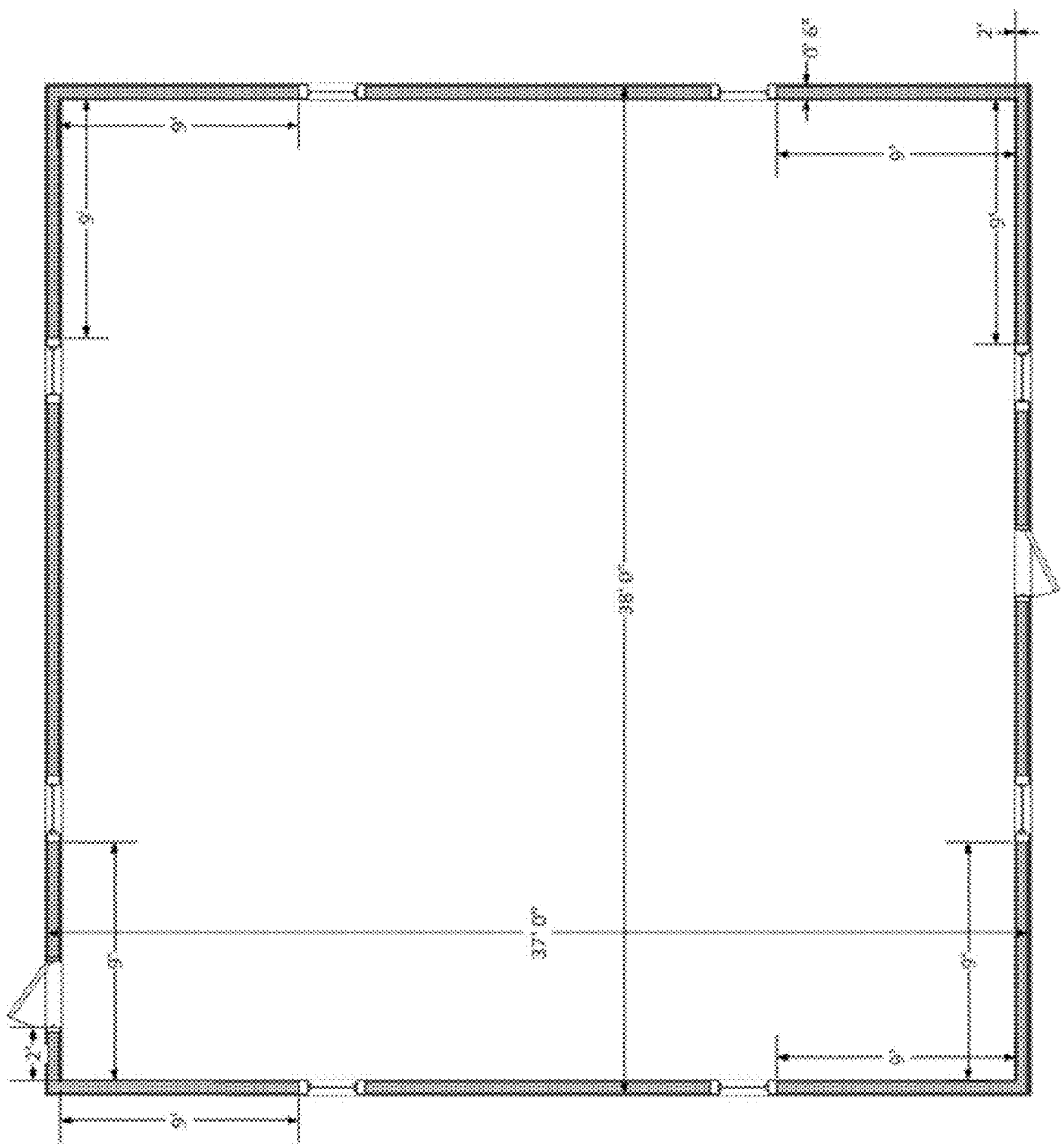
FIG. 7 illustrates the external walls of a building constructed with ballistic constructs.

FIG. 7 shows one embodiment of a floor structure of a building constructed with ballistic constructs. The building comprises four external walls. In one embodiment, the external walls of the building are 6" (six inches) thick, with a 5½" (five and a half inches) ballistic concrete core and a ¼" (quarter inch) ballistic fiberglass shell. In one embodiment the ballistic fiberglass shell is rated to stop 9 mm rounds. The internal walls of the building comprise ½" (half inch) thick ballistic fiberglass. The internal walls are 8' (eight feet) tall and 4' (four feet) wide. In one embodiment the internal walls are rated to stop up to UL 752 Level 3. In another embodiment the internal walls are rated to stop up to UL 752 Level 1. In an embodiment the internal walls are movable.

Figure 8A:
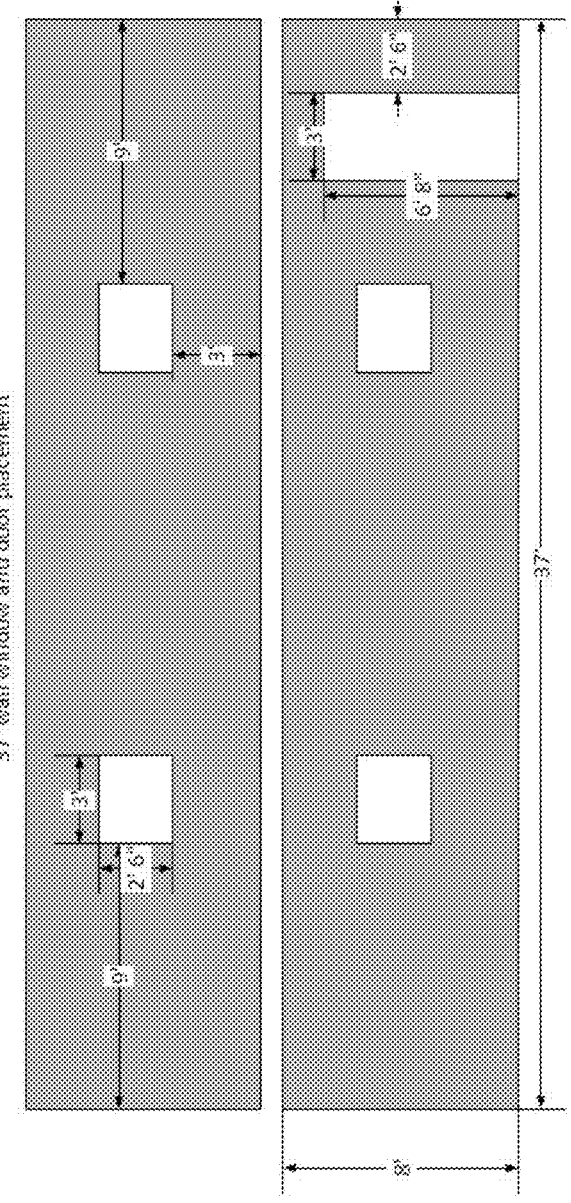
FIG. 8A illustrates a wall and window placement layout for a building constructed with ballistic constructs.
Figure 8B:
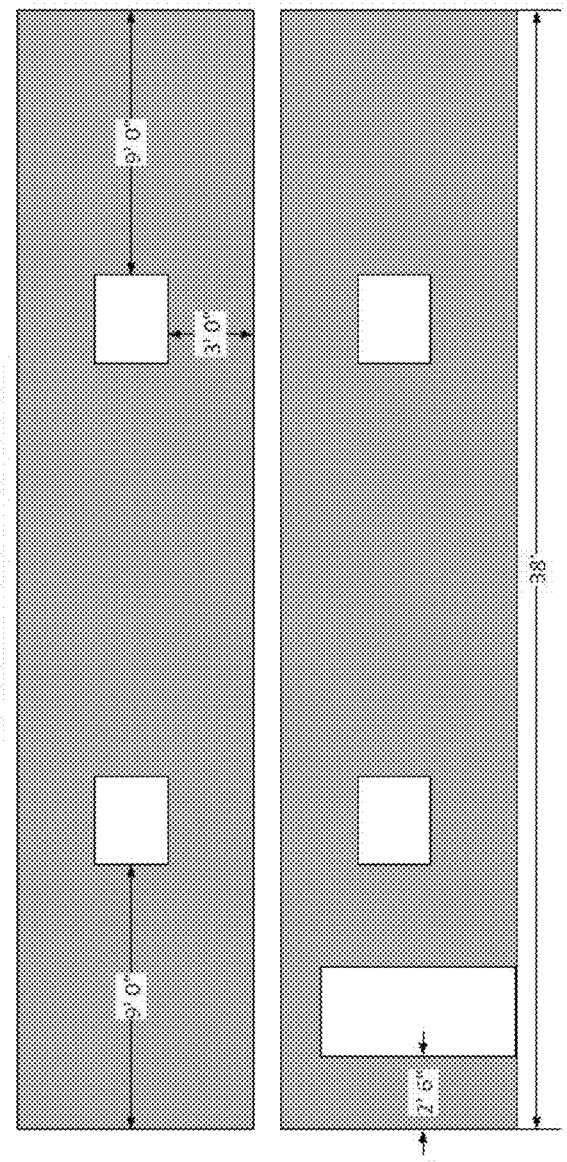
FIG. 8B illustrates an alternate wall and window placement layout for a building constructed with ballistic constructs.

The building shown in FIG. 7 has an area of 38' (thirty-eight feet) by 37' (thirty-seven feet), and comprises two 38' external walls and two 37' external walls. In one embodiment, the two external walls of the building that are 37' long each contain two windows, and the two external walls of the building that are 38' long each contain two windows and a door. In another embodiment, as shown in FIGS. 8A and 8B, one of the 37' external walls contains two windows and the other contains two windows and a door, and one of the 38' external walls contains two windows and the other contains two windows and a door. In one embodiment, each window is 9' inwards from the edge of a wall. In a further embodiment, each window is 3' (three feet) from the floor of the building, 3' (three feet) from the ceiling of the building, and is 2'6" (two feet and six inches) tall by 3' (three feet) wide. In an embodiment, each door is 6'8" (six feet and eight inches) tall, 3' (three feet) wide, and is located 2'6" (two feet and six inches) inwards from the edge of a wall.

Figure 9:
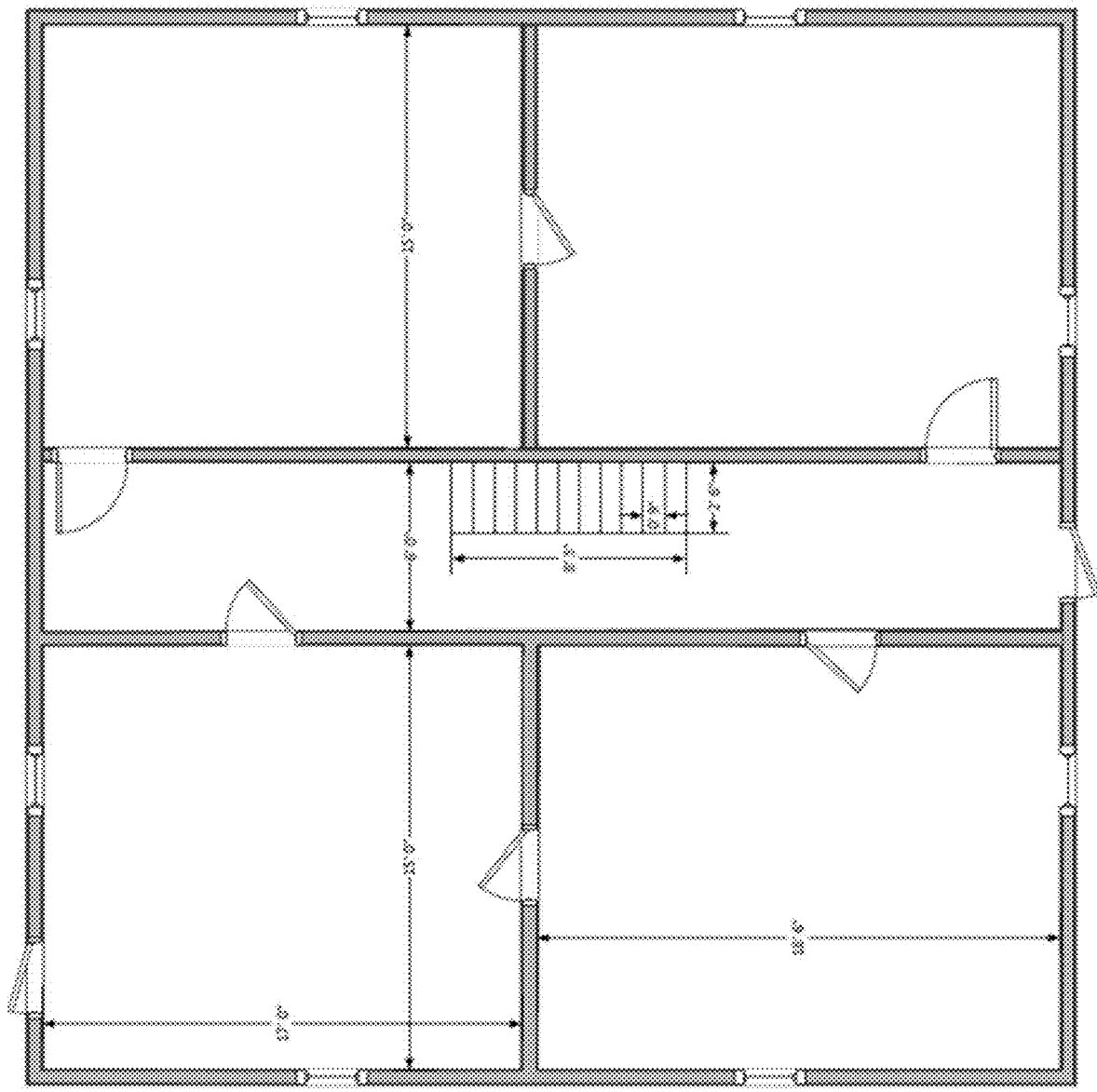
FIG. 9 illustrates a four room and hallway layout of a building constructed with ballistic constructs.

FIG. 9 shows one embodiment of a building constructed with ballistic constructs. This embodiment comprises four rooms and a hallway on a first floor of the building.

Figure 10:
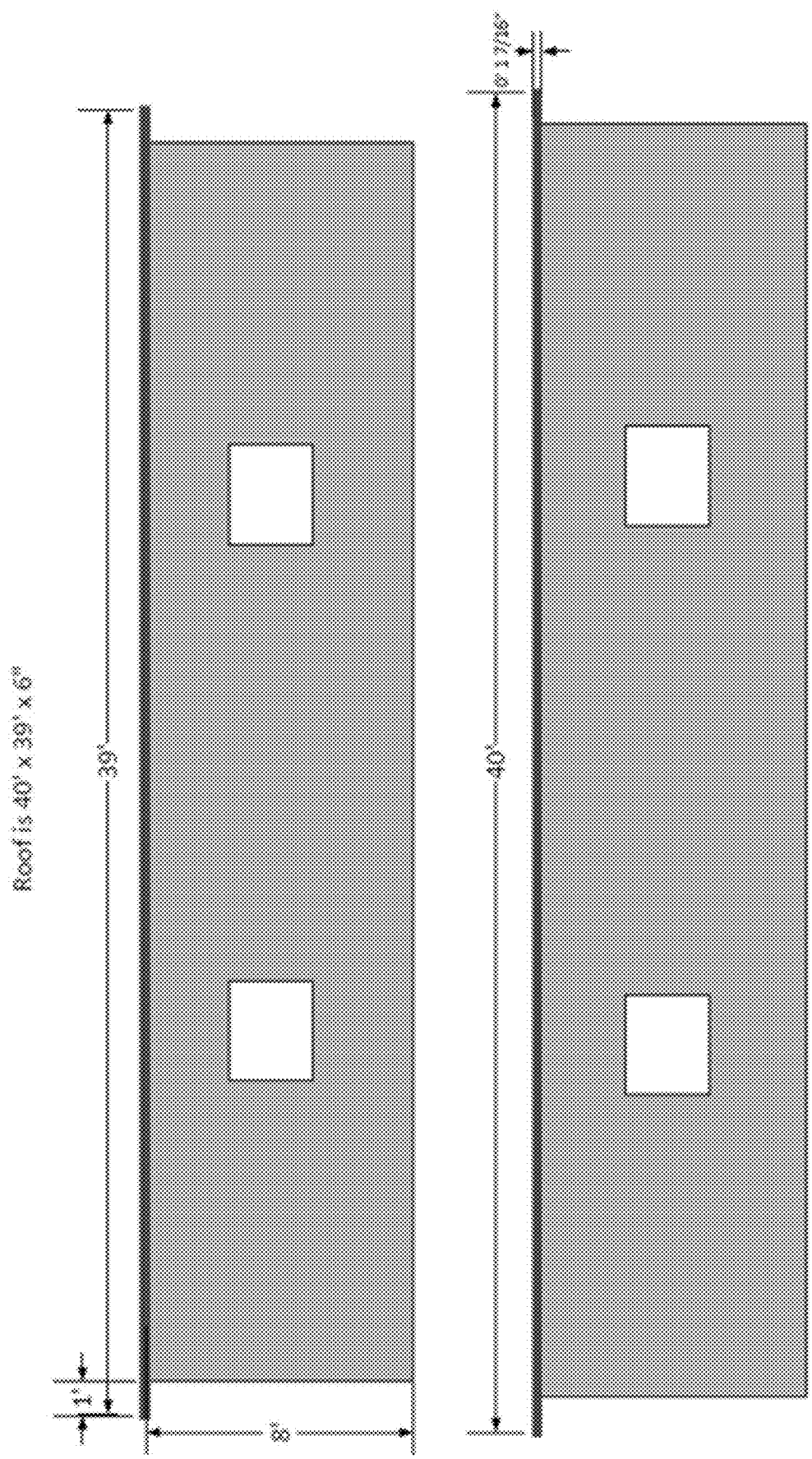
FIG. 10 illustrates two side views of a roof of a building constructed with ballistic constructs.

FIG. 10 shows the roof of a building constructed with ballistic constructs. In one embodiment, the roof has dimensions of 40' (forty feet) by 39' (thirty-nine feet) by 6" (six inches), where 1$\frac{7}{16}$" (one and seven-sixteenths of an inch) of the 6" is comprised of ballistic fiberglass. In a further embodiment, the roof is modular, allowing for ease of installation and replacement.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A bullet-absorbing ballistic construct comprising:
a ballistic concrete mixture and a ballistic fiberglass mold;
wherein the ballistic concrete mixture comprises a grout of cement, fine aggregate, water, a chemical air entrainment additive, and fiber;
wherein the ballistic concrete mixture is cured inside the ballistic fiberglass mold such that the ballistic concrete is bonded to the ballistic fiberglass of the ballistic fiberglass mold; and
wherein the ballistic fiberglass comprises Aramid, Spectra, Graphite, Basalt, Nomex, Carbon, Cellulose, or Boron fibers or wherein the ballistic fiberglass comprises a polyester, polyethylene, polypropylene, vinyl ester, epoxy, polyurethane, bismaleimide, polyimide, or phenolic resin.

2. The ballistic construct of claim 1, wherein the ballistic construct is made by pouring the ballistic concrete mixture into the ballistic fiberglass mold with a pour drop of over 2 feet and a maximum pour depth of over 2 feet.

3. The ballistic construct of claim 1, wherein the ballistic fiberglass comprises glass fibers, and wherein the glass fibers comprise $SiO_2$, $Al_2O_3$, $B_2O_3$, CaO, or MgO.

4. The ballistic construct of claim 1, wherein the ballistic fiberglass comprises a fiber and a resin, and wherein the ballistic fiberglass mold is between 20% and 70% fiber by weight.

5. The ballistic construct of claim 1, wherein the ballistic fiberglass mold has a density of 2.9 lbs per ¼"×1'×1'.

6. A bullet-absorbing ballistic construct comprising:
a ballistic concrete mixture and a ballistic fiberglass mold;
wherein the ballistic concrete mixture comprises a grout of cement, fine aggregate, water, a chemical air entrainment additive, and fiber;
wherein the ballistic concrete mixture is cured inside the ballistic fiberglass mold such that the ballistic concrete is bonded to the ballistic fiberglass of the ballistic fiberglass mold; and
wherein the ballistic fiberglass mold of the ballistic concrete construct is painted with UV-resistant paint or water-resistant paint.

7. The ballistic construct of claim 6, wherein the ballistic fiberglass mold has a thickness of between ¼" and 1".

8. The ballistic construct of claim 6, wherein the ballistic fiberglass mold comprises a fiber and a resin, and wherein the ballistic fiberglass mold is between 20% and 70% fiber by weight.

9. The ballistic construct of claim 6, wherein the ballistic construct is made by pouring the ballistic concrete mixture into the ballistic fiberglass mold with a pour drop of over 2 feet and a maximum pour depth of over 2 feet.

10. A method for forming a bullet-absorbing ballistic construct constructed with a ballistic concrete mixture and a ballistic fiberglass mold, comprising:
obtaining a ballistic concrete mixture comprising:
(i) 1 part by mass cement;
(ii) 0.5 to 1.5 part by mass fine aggregate;
(iii) 0.005 to 0.15 part by mass fiber;
(iv) 0.005 to 0.05 part by mass calcium phosphate;
(v) 0.005 to 0.05 part by mass aluminum hydroxide; and
(vi) 0.001 to 0.05 part by mass air entrainment additive;
pouring the ballistic concrete mixture into a ballistic fiberglass mold; and
curing the ballistic concrete mixture such that the mixture adheres to the inside of the ballistic fiberglass mold.

11. The method of claim 10, wherein the ballistic fiberglass mold has a thickness of between ¼" and 1".

12. The method of claim 10, wherein the ballistic fiberglass mold comprises $SiO_2$, $Al_2O_3$, $B_2O_3$, CaO, MgO, Aramid, Spectra, Graphite, Basalt, Nomex, Carbon, Cellulose, or Boron fibers.

13. The method of claim 10, wherein the ballistic fiberglass mold comprises fiber and resin, and wherein the ballistic fiberglass mold is between 20% and 70% fiber by weight.

* * * * *